United States Patent
Wang et al.

(10) Patent No.: US 9,571,243 B2
(45) Date of Patent: Feb. 14, 2017

(54) MULTI-ANTENNA TRANSMISSION METHOD AND APPARATUS

(71) Applicant: Huawei Technologies Co., Ltd., Shenzhen, Guangdong (CN)

(72) Inventors: Jianguo Wang, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 212 days.

(21) Appl. No.: 14/167,757

(22) Filed: Jan. 29, 2014

(65) Prior Publication Data

US 2014/0146778 A1 May 29, 2014

Related U.S. Application Data

(63) Continuation of application No. PCT/CN2012/079921, filed on Aug. 10, 2012.

(30) Foreign Application Priority Data

Aug. 11, 2011 (CN) .......................... 2011 1 0230086

(51) Int. Cl.
*H04L 5/00* (2006.01)
*H04B 7/06* (2006.01)
(Continued)

(52) U.S. Cl.
CPC ............. *H04L 5/0032* (2013.01); *H04B 7/024* (2013.01); *H04B 7/063* (2013.01); *H04B 7/0626* (2013.01);
(Continued)

(58) Field of Classification Search
CPC ..... H04B 7/0626; H04B 7/063; H04B 7/0639; H04B 7/024; H04B 7/0632; H04L 5/0032; H04L 5/0035; H04L 1/0073; H04L 1/0026
See application file for complete search history.

(56) References Cited

U.S. PATENT DOCUMENTS

2009/0280747 A1* 11/2009 Sudarshan .......... H04L 25/0204
455/63.1
2010/0234054 A1* 9/2010 Ko ........................ H04B 7/024
455/501
(Continued)

FOREIGN PATENT DOCUMENTS

CA       2787254      *  7/2011
CN    101827053 A        9/2010
(Continued)

OTHER PUBLICATIONS

Huawei et al., "A/N coding schemes for large payload using DFT-S-OFDM", Oct. 11-15, 2010, 3GPP, 3GPP TSG RAN WG1 meeting #62bis, Xi'an, China, R1-105247.*

(Continued)

*Primary Examiner* — Pao Sinkantarakorn
*Assistant Examiner* — Michael Phillips
(74) *Attorney, Agent, or Firm* — Leydig, Voit & Mayer, Ltd.

(57) ABSTRACT

The present invention relates to the field of communications technologies and provides a multi-antenna transmission method and apparatus, which can reduce interference and improve system throughput. In the solutions provided in embodiments of the present invention, a reference signal RS configuration set sent by an eNB is received, CSI corresponding to each RS configuration in the RS configuration set is acquired based on the RS configuration set, the CSI set is sent to the eNB, then a signal sent by the eNB according to the CSI set is received, and data processing is performed.

(Continued)

The solutions provided in the embodiments of the present invention apply to multi-antenna signal transmission.

24 Claims, 5 Drawing Sheets

(51) Int. Cl.
*H04B 7/02* (2006.01)
*H04L 1/00* (2006.01)

(52) U.S. Cl.
CPC .......... *H04B 7/0632* (2013.01); *H04B 7/0639* (2013.01); *H04L 1/0026* (2013.01); *H04L 1/0073* (2013.01); *H04L 5/0035* (2013.01)

(56) References Cited

U.S. PATENT DOCUMENTS

| | | | |
|---|---|---|---|
| 2011/0199986 A1* | 8/2011 | Fong | H04L 5/0035 370/329 |
| 2011/0300890 A1 | 12/2011 | Hoshino et al. | |
| 2012/0039216 A1 | 2/2012 | Li et al. | |
| 2012/0106374 A1* | 5/2012 | Gaal | H04L 5/0048 370/252 |
| 2012/0106408 A1* | 5/2012 | Papasakellariou | H04L 1/1614 370/280 |
| 2012/0207043 A1* | 8/2012 | Geirhofer | H04L 5/0048 370/252 |
| 2012/0220327 A1* | 8/2012 | Lee | H04W 72/1273 455/509 |
| 2012/0257515 A1* | 10/2012 | Hugl | H04W 24/10 370/252 |
| 2012/0281555 A1* | 11/2012 | Gao | H04L 1/0031 370/252 |
| 2012/0281563 A1* | 11/2012 | Comsa | H04W 24/10 370/252 |
| 2012/0287799 A1* | 11/2012 | Chen | H04B 7/024 370/252 |
| 2012/0287875 A1* | 11/2012 | Kim | H04L 5/0048 370/329 |
| 2013/0279361 A1* | 10/2013 | Seo | H04J 11/0053 370/252 |
| 2013/0301465 A1* | 11/2013 | Seo | H04B 7/0626 370/252 |
| 2014/0016497 A1* | 1/2014 | Seo | H04L 5/0023 370/252 |
| 2014/0113677 A1* | 4/2014 | Parkvall | H04W 52/146 455/522 |
| 2014/0133336 A1* | 5/2014 | Park | H04W 24/10 370/252 |
| 2014/0146756 A1* | 5/2014 | Sahin | H04L 1/0025 370/329 |
| 2014/0321359 A1* | 10/2014 | Seo | H04L 5/0057 370/328 |

FOREIGN PATENT DOCUMENTS

| | | |
|---|---|---|
| CN | 101848499 A | 9/2010 |
| CN | 101873629 A | 10/2010 |
| CN | 102013952 A | 4/2011 |
| WO | WO 2010025148 A1 | 3/2010 |
| WO | WO 2010106725 A1 | 9/2010 |
| WO | WO 2010123270 A2 | 10/2010 |
| WO | WO 2011079294 A1 | 6/2011 |
| WO | WO 2011115421 A2 | 9/2011 |
| WO | WO 2012109037 A2 | 8/2012 |

OTHER PUBLICATIONS

3GPP, "LTE; Evolved Universal Terrestrial Radio Access (E-UTRA); Physical channels and modulation (3GPP TS 36.211 version 10.0.0 Release 10)", Jan. 2011, 3GPP, ETSI TS 136 211 V10.0.0.*

Ericsson et al., "Aspects on Distributed RRUs with Shared Cell-ID for Heterogeneous Deployments," 3GPP TSG-RAN WG1 #64, Taipei, Taiwan, R1-110649, 3$^{rd}$ Generation Partnership Project, Valbonne, France (Feb. 21-25, 2011).

* cited by examiner

MULTI-ANTENNA TRANSMISSION METHOD AND APPARATUS

CROSS-REFERENCE TO RELATED APPLICATION

This application is a continuation of International Patent Application No. PCT/CN2012/079921, filed on Aug. 10, 2012, which claims priority to Chinese Patent Application No. 201110230086.3, filed on Aug. 11, 2011. The aforementioned patent applications are hereby incorporated by reference in their entireties.

TECHNICAL FIELD

The present invention relates to the field of communications technologies, and in particular, to a multi-antenna transmission method and apparatus.

BACKGROUND

At present, in a distributed antenna system that is separated geographically, low-power RRHs (Remote Radio Head, remote radio head) are all distributed in coverage of a macro cell, where each RRH connects to an eNB (Evolved Node B, evolved base station) through a fiber, and a macro base station directly connects to the eNB. The RRHs or the macro base station sends data to a UE (User Equipment, user equipment) through respective TPs (Transmission Point, transmission point/transmission point), and in an existing CoMP (Coordinated Multi-Point operation, coordinated multi-point transmission) system, the data can be sent to the UE through multiple TPs.

Here, the two TPs jointly sending data to a UE is used as an example for description: The eNB notifies the UE of two CSI RS (Channel State Information Reference Signal, channel state information reference signal) configurations, where the CSI RS configurations correspond to the two TPs. For example, the two CSI RS configurations, namely, CSI RS Config.0 and CSI RS Config.1, correspond to the macro base station and RRH1, respectively; then, the UE measures CSI (Channel State Information, channel state information) according to the two received CSI RS configurations and feeds back the measured CSI to the eNB, where the CSI includes an RI (Rank Indicator, rank indicator) and/or a PMI (Precoding Matrix Indicator, precoding matrix indicator) and/or a CQI (Channel Quality Indicator, channel quality indicator) and phase adjustment information between two CSI RSs, and the phase adjustment information carries a phase adjustment factor $e^{j\theta}$. For example, a PMI corresponding to CSI RS Config.0 and that corresponding to CSI RS Config.1 are PMI0 and PMI1, respectively, it is assumed that PMI0 and PMI1 indicate precoding matrices V0 and V1, respectively, and in this case, after phase adjustment, an obtained precoding matrix is $V=[V0, e^{j\theta}V1]^T$; after receiving the CSI fed back by the UE, the eNB may perform data transmission based on the received CSI, for example, data after precoding is VS, where S is a vector formed by a modulation symbol to be sent; the UE receives a signal y sent by the eNB and detects transmitted data according to y, where $y=HVS+n$, $H=[H0\ H1]$, H0 and H1 are channel matrices from the UE to the two TPs, and n is received noise and interference; and in this way, transmitted data S can be obtained according to y.

However, the UE receives signals transmitted by geographically separated TPs and then received power from TPs is different. The precoding matrix obtained according to the prior art does not apply to a channel matrix with power imbalance and therefore interference cannot be effectively canceled or suppressed, thereby resulting in degradation in system throughput.

SUMMARY

Embodiments of the present invention provide a multi-antenna transmission method and apparatus which can avoid a power imbalance problem, effectively cancel or suppress interference, and improve system throughput.

The embodiments of the present invention adopt the following technical solutions to achieve the foregoing objectives:

A multi-antenna transmission method includes:
receiving, by a user equipment UE, a reference signal RS configuration set sent by an evolved base station eNB, and acquiring, based on the RS configuration set, channel state information CSI corresponding to each RS configuration in the RS configuration set, where the RS configuration set includes at least two RS configurations;
sending, by the UE, a CSI set to the eNB, where the CSI set includes the CSI corresponding to each RS configuration in the RS configuration set; and
receiving, by the UE, a signal sent by the eNB according to the CSI set, and performing data processing.

A multi-antenna transmission method includes:
sending, by an eNB, an RS configuration set to a UE, so that the UE acquires, according to the received RS configuration set, CSI corresponding to each RS configuration in the RS configuration set, where the RS configuration set includes at least two RS configurations;
receiving, by the eNB, a CSI set sent by the UE, where the CSI set includes the CSI corresponding to each RS configuration in the RS configuration set; and
sending, by the eNB, data to the UE according to the received CSI set.

A multi-antenna transmission apparatus includes:
a receiving and measuring unit, configured to receive a reference signal RS configuration set sent by an evolved base station eNB, and acquire, based on the RS configuration set, channel state information CSI corresponding to each RS configuration in the RS configuration set, where the RS configuration set includes at least two RS configurations;
a sending unit, configured to send a CSI set to the eNB, where the CSI set includes the channel state information CSI corresponding to each RS configuration in the RS configuration set; and
a data processing unit, configured to receive a signal sent by the eNB according to the CSI set, and perform data processing.

A multi-antenna transmission apparatus includes:
a sending unit, configured to send an RS configuration set to a UE, so that the UE acquires, according to the received RS configuration set, CSI corresponding to each RS configuration in the RS configuration set, where the RS configuration set includes at least two RS configurations;
a receiving unit, configured to receive the CSI set sent by the UE, where the CSI set includes the CSI corresponding to each RS configuration in the RS configuration set; and
a data sending unit, configured to send data to the UE according to the received CSI set.

Embodiments of the present invention provide a multi-antenna transmission method and apparatus. A reference signal RS configuration set sent by an eNB is received, CSI corresponding to each RS configuration in the RS configuration set is acquired based on the RS configuration set, a CSI set is sent to the eNB, then a signal sent by the eNB according to the CSI set can be received, and data processing is performed. Compared with the prior art in which a UE receives signals transmitted by geographically separated TPs and then received power is different, a precoding matrix obtained according to the prior art does not apply to a channel matrix with power imbalance, and therefore interference cannot be effectively canceled or suppressed and system throughput is reduced, in the solutions provided in the embodiments of the present invention, CSI feedback can be performed for TPs resulting in different received power at a UE, thereby avoiding the power imbalance problem, effectively canceling or suppressing interference, and effectively improving system throughput.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
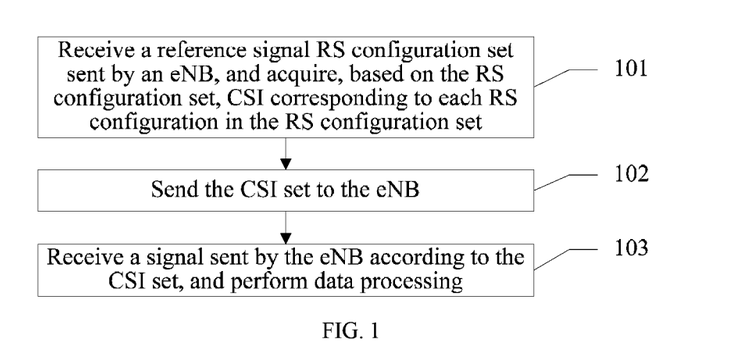
FIG. 1 is a flowchart of a multi-antenna transmission method according to Embodiment 1 of the present invention.

This embodiment of the present invention provides a multi-antenna transmission method. As shown in FIG. 1, the method includes:

Step 101: A user equipment UE receives a reference signal RS configuration set sent by an evolved base station eNB, and acquires, based on the RS configuration set, channel state information CSI corresponding to each RS configuration in the RS configuration set, where the RS configuration set includes at least two RS configurations.

Step 102: The UE sends a CSI set to the eNB, where the CSI set includes the channel state information CSI corresponding to each RS configuration in the RS configuration set.

Step 103: The UE receives a signal sent by the eNB according to the CSI set, and performs data processing.

The method is executed by a UE (User Equipment, user equipment), where the UE includes a user terminal, a mobile station, a relay (Relay) receiving downlink data, or the like.

Figure 2:
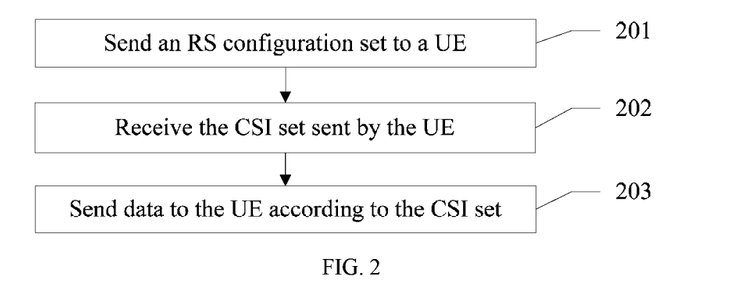
FIG. 2 is a flowchart of another multi-antenna transmission method according to Embodiment 1 of the present invention.

This embodiment of the present invention further provides a multi-antenna transmission method. As shown in FIG. 2, the method includes:

Step 201: An eNB sends an RS configuration set to a UE, so that the UE acquires, according to the received RS configuration set, CSI corresponding to each RS configuration in the RS configuration set, where the RS configuration set includes at least two RS configurations.

Step 202: The eNB receives a CSI set sent by the UE, where the CSI set includes the CSI corresponding to each RS configuration in the RS configuration set.

Step 203: The eNB sends data to the UE according to the CSI set.

The method is executed by an eNB (Evolved Node B, evolved base station), the eNB may also be referred to as an evolved NodeB, and the eNB may include a base station, an RRH, and a relay (Relay) configured to send downlink data.

This embodiment of the present invention provides a multi-antenna transmission method and apparatus. A reference signal RS configuration set sent by an eNB is received, CSI corresponding to each RS configuration in the RS configuration set is acquired based on the RS configuration set, a CSI set is sent to the eNB, then a signal sent by the eNB according to the CSI set can be received, and data processing is performed. Compared with the prior art in which a UE receives signals transmitted by geographically separated TPs and then received power from TPs is different, a precoding matrix obtained according to the prior art does not apply to a channel matrix with power imbalance, and therefore interference cannot be effectively canceled or suppressed and system throughput is reduced, in the solution provided in this embodiment of the present invention, CSI feedback can be performed for TPs resulting in different received power at a UE, thereby avoiding a power imbalance problem, effectively canceling or suppressing interference, and effectively improving system throughput.

Figure 3:
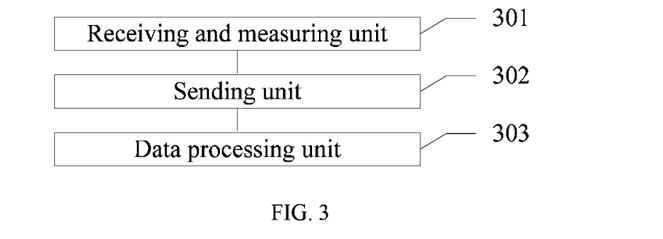
FIG. 3 is a block diagram of a multi-antenna transmission apparatus according to Embodiment 1 of the present invention.

This embodiment of the present invention provides a multi-antenna transmission apparatus, where the apparatus may be a UE. Corresponding to the method illustrated in FIG. 1, as shown in FIG. 3, the apparatus includes: a receiving and measuring unit 301, a sending unit 302, and a data processing unit 303.

The receiving and measuring unit 301 is configured to receive a reference signal RS configuration set sent by a base station eNB, and acquire, based on the RS configuration set, channel state information CSI corresponding to each RS configuration in the RS configuration set, where the RS configuration set includes at least two RS configurations, and each piece of CSI in a CSI set is sequentially corresponding to each RS configuration in the RS configuration set.

The sending unit 302 is configured to send the CSI set to the eNB, where the CSI set includes the channel state information CSI corresponding to each RS configuration in the RS configuration set.

The data processing unit 303 is configured to receive a signal sent by the eNB according to the CSI set, and perform data processing.

Figure 4:
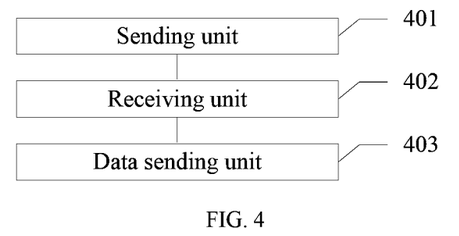
FIG. 4 is a block diagram of another multi-antenna transmission apparatus according to Embodiment 1 of the present invention.

This embodiment of the present invention provides another multi-antenna transmission apparatus, where the apparatus may be an eNB. Corresponding to the method illustrated in FIG. 2, as shown in FIG. 4, the apparatus includes: a sending unit 401, a receiving unit 402, and a data sending unit 403.

The sending unit 401 is configured to send an RS configuration set to a UE, so that the UE acquires, according to the received RS configuration set, CSI corresponding to each RS configuration in the RS configuration set, where the RS configuration set includes at least two RS configurations.

The receiving unit 402 is configured to receive a CSI set sent by the UE, where the CSI set includes the CSI corresponding to each RS configuration in the RS configuration set.

The data sending unit 403 is configured to send data to the UE according to the CSI set.

This embodiment of the present invention provides a multi-antenna transmission apparatus. A receiving and measuring unit receives a reference signal RS configuration set sent by an eNB, and acquires, based on the RS configuration set, CSI corresponding to each RS configuration in the RS configuration set; a sending unit sends a CSI set to the eNB, and then a data processing unit may receive a signal sent by the eNB according to the CSI set and perform data processing. Compared with the prior art, in the solution provided in this embodiment of the present invention, CSI feedback can be performed for TPs resulting in different received power at a UE, thereby avoiding a power imbalance problem, effectively canceling or suppressing interference, and effectively improving system throughput.

Embodiment 2

Figure 5:
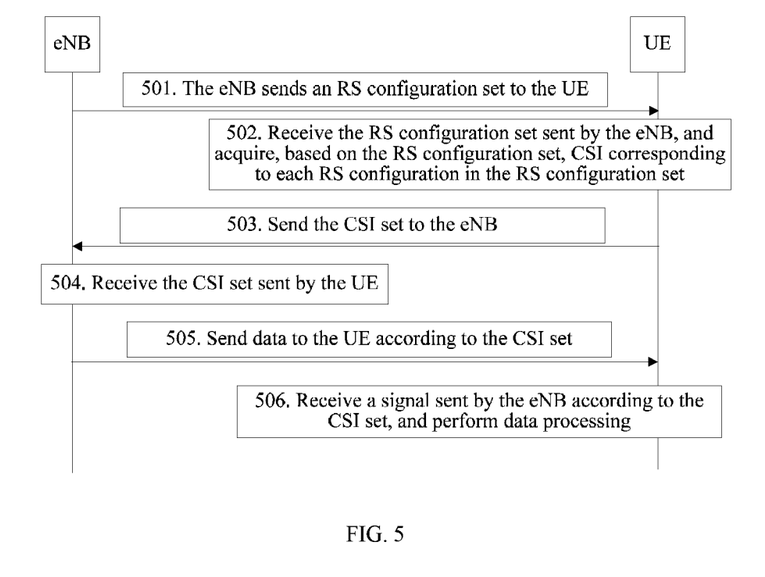
FIG. 5 is a flowchart of a multi-antenna transmission method according to Embodiment 2 of the present invention.

This embodiment of the present invention provides a multi-antenna transmission method. As shown in FIG. 5, the method includes:

Step 501: An eNB sends an RS configuration set to a UE, so that the UE acquires, according to the received RS configuration set, channel state information CSI corresponding to each RS configuration in the RS configuration set, where the RS configuration set includes at least two RS configurations.

The RS (Reference Signal, reference signal) configuration set may include RS configurations that have a same cell identifier. In this way, scheduling can be performed by one scheduler, which is convenient for scheduling and management, because the RS configurations that have the same cell identifier are adopted.

Resources occupied by the RS configurations that have the same cell identifier are orthogonal to each other. That resources occupied by the RS configurations that have the same cell identifier are orthogonal to each other includes:

the RS configurations that have the same cell identifier occupy different time resources; or the RS configurations that have the same cell identifier occupy different frequency resources; or the RS configurations that have the same cell identifier occupy different sequence resources; or the RS configurations that have the same cell identifier occupy different scrambling code resources.

Adopting RS resources that are orthogonal to each other may reduce interference between different RSs, thereby improving precision of channel estimation.

Further, each RS configuration in the RS configuration set may have a same number of antenna ports, for example, each RS configuration in the RS configuration set may have one antenna port or have two antenna ports or have eight antenna ports. An inner structural feature of an RS configuration may be used for a setting of an antenna port, for example, a nesting feature of the RS configuration may be used, and in this way, a signaling design for the RS configuration set to send a notification to the UE can be simplified, and implementation complexity of channel estimation at a UE can also be reduced.

It should be noted that each RS configuration in the RS configuration set corresponds to different TPs (Transmission Point, transmission point/transmission point). In this way, TPs resulting in different received power can be effectively distinguished, which facilitate separate processing on different TPs, thereby avoiding a performance loss caused by processing, using an antenna port with balanced power, an antenna port with power imbalance.

Step 502: The UE receives the RS configuration set sent by the eNB, and acquires, based on the RS configuration set, the CSI corresponding to each RS configuration in the RS configuration set, where the RS configuration set includes at least two RS configurations.

Specifically, the CSI includes at least one of the following: a rank indicator RI, a precoding matrix indicator PMI, a channel quality indicator CQI, a precoding type indicator PTI, and other channel state information; and the following four manners can be adopted to measure each piece of CSI in a CSI set:

Manner 1: The CSI, corresponding to each RS configuration, in the CSI set may be calculated separately based on the RS configuration set:

That the UE receives three RS configurations is used as an example, and it is assumed that the received RS configurations are $Config_0$, $Config_1$, and $Config_2$, respectively, the numbers of corresponding antenna ports are $N_0$, $N_1$, and $N_2$, respectively, and corresponding CSI is $CSI_0$, $CSI_1$, and $CSI_2$, respectively. In this case, $CSI_0$ (including $RI_0$ and/or $PMI_0$ and/or $CQI_0$), $CSI_1$ (including $RI_1$ and/or $PMI_1$ and/or $CQI_1$), and $CSI_2$ (including $RI_2$ and/or $PMI_2$ and/or $CQI_2$) may be acquired respectively based on the three RS configurations received by the UE.

It should be noted that during calculation of a certain piece of CSI, it may be considered that interference from antenna ports that correspond to a part or all of other RS configurations in the RS configuration set exists, where other RS configurations are RS configurations except the RS configuration that corresponds to the currently calculated CSI; the interference from the antenna ports that correspond to the part or all of other RS configurations in the RS configuration set may also not be considered, or interference from antenna ports that correspond to a part or all of RS configurations in the RS configuration set has been canceled. For example, $RI_i$ and/or $PMI_i$ may be calculated as follows based on a capacity or throughput maximization criterion:

$$RI_i = \underset{rank}{\operatorname{argmax}} \underset{pmi: P_{pmi} \in CB_{N_i,rank}}{\max} C_{y_i}(rank, pmi) \quad (1)$$

$$PMI_i = \arg \underset{pmi: P_{pmi} \in CB_{N_i,RI_i}}{\max} C_{y_i}(RI_i, pmi) \quad (2)$$

In the equations, i=0, 1, or N−1, N is equal to 3 and denotes the number of CSI in the CSI set, $CB_{N_i,rank}$ denotes a code book of $N_i$ antennas with a rank being rank, and $P_{pmi}$ denotes a precoding matrix corresponding to the precoding matrix indicator pmi. $C_{y_i}$(rank, pmi) denotes a function for obtaining capacity or throughput by using rank as the rank, pmi as the precoding matrix indicator, and an equation corresponding to $y_i$ as a system equation. The equation corresponding to $y_i$ may be shown as (3) or (4):

$$y_i = H_i P_{pmi} s_i + \sum_{j \neq i} \frac{1}{\sqrt{N_j}} H_j s_j + n, \ P_{pmi} \in CB_{N_i,rank} \quad (3)$$

or $$y_i = H_i P_{pmi} s_i + n, \ P_{pmi} \in CB_{N_i,rank} \quad (4)$$

In the equations, $H_i$ denotes a corresponding channel that the UE obtains by measuring an RS configuration $Config_i$, where i=0, 1, or 2; $s_i$ denotes transmitted data or a transmitted modulation symbol; and n is noise and interference except interference from an antenna port that corresponds to each RS configuration in the RS configuration set. It should be noted that in (3), interference from an antenna port that corresponds to a part of RS configurations is considered, whereas in (4), interference from an antenna port that corresponds to a part of RS configurations is not considered.

$CQI_i$ is calculated based on the $RI_i$ and/or the $PMI_i$, where $CQI_i$ denotes an $i^{th}$ channel quality indicator. Further, $CQI_i$ may be calculated based on the assumption that one or more transmission blocks (or code words) are transmitted, and in this case, one or more $CQI_i$ can be obtained.

Specifically, the UE obtains a corresponding channel when measuring an RS configuration, obtains a signal-to-noise ratio or an equivalent signal-to-noise ratio based on the adopted system equation (3) or (4) and an adopted receiver, and may obtain a CQI by using a mapping relationship between the signal-to-noise ratio and the CQI. Here, the receiver may be an MMSE (minimum mean square error) receiver.

In addition, one or more CQIs may also be calculated based on the multiple or all $RI_i$ and/or the multiple or all $PMI_i$, where each CQI corresponds to one transmission block (or code word).

Manner 2: The CSI, corresponding to each RS configuration, in the CSI set may also be calculated jointly based on the RS configuration set:

For example, the UE receives three RS configurations, namely, $Config_0$, $Config_1$, and $Config_2$, respectively, the numbers of corresponding antenna ports are $N_0$, $N_1$, and $N_2$, respectively, and therefore three pieces of CSI, namely, $CSI_0$ (including $RI_0$ and/or $PMI_0$ and/or $CQI_0$), $CSI_1$ (including $RI_1$ and/or $PMI_1$ and/or $CQI_1$), and $CSI_2$ (including $RI_2$ and/or $PMI_2$ and/or $CQI_2$) are acquired respectively. In this case, $RI_i$ and/or $PMI_i$ may be calculated as follows based on a capacity or throughput maximization criterion:

$$(RI_0, RI_1, RI_2) = \arg \underset{(r_0,r_1,r_2)}{\max} \underset{(p_0,p_1,p_2)}{\max} f_y(r_0, r_1, r_2, p_0, p_1, p_2) \quad (5)$$

$$(PMI_0, PMI_1, PMI_2) = \arg \underset{(p_0,p_1,p_2)}{\max} f_y(RI_0, RI_1, RI_2, p_0, p_1, p_2) \quad (6)$$

In the equations, $f_y(r_0,r_1,r_2,p_0,p_1,p_2)$ denotes a function for obtaining capacity or throughput by using $r_0$, $r_1$ and $r_2$ as ranks, $p_0$, $p_1$ and $p_2$ as precoding matrix indicators, and an equation corresponding to y as the system equation. The equation corresponding to y is shown as (7):

$$y = \sum_i H_i P_{p_i} s_i + n, \ P_{p_i} \in CB_{N_i,r_i}, \ i = 0, 1, 2 \quad (7)$$

For each RS configuration $Config_i$, where i=0, 1, or 2, $CQI_i$ may be calculated based on the obtained $RI_i$ and/or $PMI_i$. Specifically, the UE obtains a corresponding channel when measuring an RS configuration, obtains a signal-to-noise ratio or an equivalent signal-to-noise ratio based on the adopted system equation (7), a precoding matrix corresponding to the obtained $RI_i$ and/or $PMI_i$, and an adopted receiver such as an MMSE (minimum mean square error) receiver, and may obtain each CQI by using a mapping relationship between the signal-to-noise ratio and the CQI.

Manner 3: The CSI, corresponding to each RS configuration, in the CSI set may also be calculated based on the assumption that no interference from antenna ports that correspond to a part or all of other RS configurations in the RS configuration set exists, or the interference from the antenna ports that correspond to the part or all of other RS configurations in the RS configuration set has been canceled. The assumption made here may be indicated explicitly by the eNB, for example, it is notified directly. The assumption may also be indicated implicitly by the eNB, for example, in step 501, when the eNB sends the RS configuration set to the UE, the assumption is indicated implicitly by a position sequence of each RS configuration in the RS configuration set. For example, for $CSI_2$, it is assumed that interference corresponding to CSI RS Config.0 and CSI RS Config.2 is canceled; for $CSI_1$, it is assumed that interference corresponding to CSI RS Config.0 is canceled and interference corresponding to CSI RS Config.2 exists; and for $CSI_0$, it is assumed that the interference corresponding to CSI RS Config.0 and CSI RS Config.2 exists. The made assumption may also be reported to the eNB by the UE during measurement.

That the UE receives three RS configurations is used as an example, and it is assumed that the received RS configurations are $Config_0$, $Config_1$, and $Config_2$, respectively, the numbers of corresponding antenna ports are $N_0$, $N_1$, and $N_2$, respectively, and corresponding CSI is $CSI_0$, $CSI_1$, and $CSI_2$, respectively. In this case, $CSI_0$ (including $RI_0$ and/or $PMI_0$ and/or $CQI_0$), $CSI_1$ (including $RI_1$ and/or $PMI_1$ and/or $CQI_1$), and $CSI_2$ (including $RI_2$ and/or $PMI_2$ and/or $CQI_2$) may be calculated based on that no interference from the antenna ports that correspond to the part or all of other RS configurations in the RS configuration set exists, or the interference from the antenna ports that correspond to the part or all of other RS configurations in the RS configuration set has been canceled. For example, $RI_2$ and/or $PMI_2$ may be calculated as follows based on a capacity or throughput maximization criterion:

$$RI_2 = \underset{r_2}{\text{argmax}} \underset{p_2}{\text{max}}\ g_{y_2}(r_2, p_2) \qquad (8)$$

$$PMI_2 = \underset{p_2}{\text{argmax}}\ g_{y_2}(RI_2, p_2) \qquad (9)$$

In the equations, $g_{y_2}(r_2, p_2)$ denotes a function for obtaining capacity or throughput by using $r_2$ as the rank, $p_2$ as the precoding matrix indicator, and an equation corresponding to $y_2$ as the system equation. The equation corresponding to $y_2$ is shown as (9):

$$y_2 = H_2 P_{p_2} s_2 + n, P_{p_2} \in CB_{N_2, r_2} \qquad (10)$$

It should be noted that in equation (10), it is assumed that no interference from antenna ports that correspond to Config$_0$ and Config$_1$ exists. In addition, for the RS configuration Config$_2$, CQI$_2$ may be calculated based on the obtained RI$_2$ and/or PMI$_2$, and CQI$_2$ may further be calculated based on that no interference from antenna ports that correspond to Config$_0$ and Config$_1$ exists.

RI$_1$ and/or PMI$_1$ is calculated as follows:

$$RI_1 = \underset{r_1}{\text{argmax}} \underset{p_1}{\text{max}}\ g_{y_1}(r_1, p_1) \qquad (11)$$

$$PMI_1 = \underset{p_1}{\text{argmax}}\ g_{y_1}(RI_1, p_1) \qquad (12)$$

In the equations, $g_{y_1}(r_1, p_1)$ denotes a function for obtaining capacity or throughput by using $r_1$ as the rank, $p_1$ as the precoding matrix indicator, and an equation corresponding to $y_1$ as the system equation. The equation corresponding to $y_1$ is shown as (13):

$$y_1 = H_1 P_{p_1} s_1 + \frac{1}{\sqrt{N_2}} H_2 s_2 + n \qquad (13)$$

It should be noted that in equation (13), it is assumed that no interference from an antenna port that corresponds to Config$_0$ exists, and only interference from an antenna port that corresponds to Config$_2$ is included. In addition, for the RS configuration Config$_1$, CQI$_1$ may be calculated based on the obtained RI$_1$ and/or PMI$_1$, and CQI$_1$ may further be calculated based on that the interference from the antenna port that corresponds to Config$_2$ exists. Alternatively, further, the equation corresponding to $y_1$ is shown as (14):

$$y_1 = H_1 P_{p_1} s_1 + H_2 P_{PMI_2} s_2 + n, P_{PMI_2} \in CB_{N_2, RI_2} \qquad (14)$$

In this case, CSI$_1$ is further calculated based on CSI$_2$.

RI$_0$ and/or PMI$_0$ is calculated as follows:

$$RI_0 = \underset{r_0}{\text{argmax}} \underset{p_0}{\text{max}}\ g_{y_0}(r_0, p_0) \qquad (15)$$

$$PMI_0 = \underset{p_0}{\text{argmax}}\ g_{y_0}(RI_0, p_0) \qquad (16)$$

In the equations, $g_{y_0}(r_1, p_1)$ denotes a function for obtaining capacity or throughput by using $r_0$ as the rank, $p_0$ as the precoding matrix indicator, and an equation corresponding to $y_0$ as the system equation. The equation corresponding to $y_0$ is shown as (17):

$$y_0 = H_0 P_{p_0} s_0 + \frac{1}{\sqrt{N_1}} H_1 s_1 + \frac{1}{\sqrt{N_2}} H_2 s_2 + n \qquad (17)$$

It should be noted that in equation (17), it is assumed that interference from antenna ports that correspond to Config$_1$ and Config$_2$ is included. In addition, for the RS configuration Config$_0$, CQI$_0$ may be calculated based on the obtained RI$_0$ and/or PMI$_0$, and CQI$_0$ may further be calculated based on that the interference from antenna ports that correspond to Config$_1$ and Config$_2$ exists.

Alternatively, further, the equation corresponding to $y_0$ is shown as (18):

$$y_0 = H_0 P_{p_0} s_0 + H_1 P_{PMI_1} s_1 + H_2 P_{PMI_2} s_2 + n, P_{PMI_i} \in CB_{N_i, R^i},\ i=1,2 \qquad (18)$$

In this case, CSI$_0$ is further calculated based on CSI$_1$ and CSI$_2$.

Manner 4: The CSI corresponding to each RS configuration in the RS configuration set is acquired based on the RS configuration set, where at the time of the acquiring the CSI corresponding to each RS configuration in the RS configuration set, the CSI, corresponding to each RS configuration, in the CSI set is calculated based on CSI corresponding to a part or all of other RS configurations in the RS configuration set.

Further, the part or all of other RS configurations that correspond to the CSI corresponding to the part or all of other RS configurations in the RS configuration set are obtained based on a received indication sent by the eNB or are reported by the UE to the eNB.

Moreover, the received indication sent by the eNB is obtained by receiving, by the UE, a location sequence of each RS configuration in the RS configuration set sent by the eNB.

For example, that the UE receives three RS configurations is used as an example, and it is assumed that the received RS configurations are Config$_0$, Config$_1$, and Config$_2$, respectively, and Config$_0$, Config$_1$, and Config$_2$ are CSI RS Config.0, CSI RS Config.2, and CSI RS Config.1, respectively. In this case, processing is performed according to the foregoing equations (8)-(12), (14)-(16), and (18), CSE is calculated based on CSI$_2$, and CSI$_0$ is calculated based on CSI$_1$ and CSI$_2$. The calculation based on the CSI corresponding to the part or all of RS configurations may be notified by the eNB or reported by the UE.

It should be noted that interference can be further canceled by calculating the CSI based on the assumption that the interference from the antenna ports that correspond to the part or all of RS configurations in the RS configuration set is canceled, and performing serial interference cancellation at a receive end; a degree of interference cancellation can be further optimized, and particularly an impact of received power imbalance is eliminated by specifying a sequence of the interference cancellation, and in this way, precision of the CSI calculation can be improved by further assuming that the calculation is performed based on the CSI corresponding to the part or all of other RS configurations; in addition, CSI precision can be further optimized, and particularly the impact of received power imbalance is adaptively eliminated by specifying a sequence of the calculation based on the CSI corresponding to the part or all of other RS configurations.

In addition, it should be noted that, during the CSI calculation, the number of antennas that correspond to a code book used by CSI that corresponds to each RS configuration is identical with the number of antenna ports in the RS configuration. A code book corresponding to a single antenna port is formed by a scalar, for example, CSI corresponding to the single antenna port may be formed by a CQI only.

Further, for the CSI corresponding to each RS configuration in the RS configuration set, during CQI calculation, the calculation may be performed according to that one or more transmission blocks (or code words) or layers are transmitted, and therefore one or more CQIs are obtained, where each CQI corresponds to a transmission block (or code word) or layer.

Step 503: The UE sends the CSI set to the eNB, so that the eNB performs data transmission based on the received CSI set.

It should be noted that the CSI set includes at least one piece of CSI, and each piece of CSI in the CSI set corresponds to each RS configuration in the RS configuration set in step 501.

Specifically, the CSI set may be sent to the eNB through a PUSCH (Physical Uplink Shared Channel, physical uplink shared channel); or the CSI set is sent to the eNB through a PUCCH (Physical Uplink Control Channel, physical uplink control channel).

Figure 6:
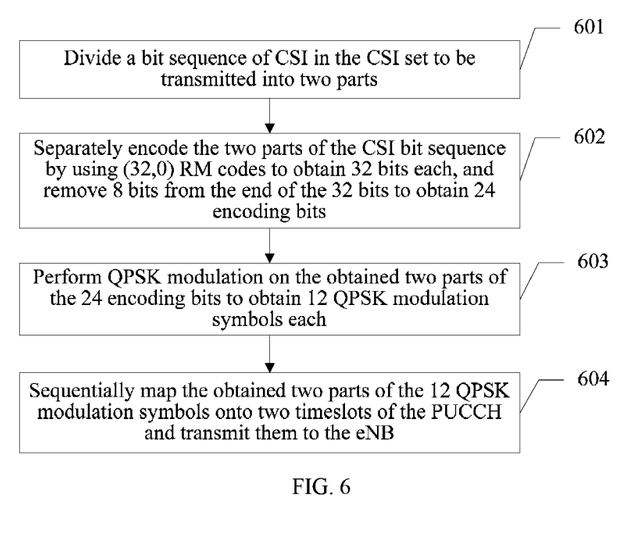
FIG. 6 is a flowchart of a method for sending a CSI set to an eNB through a PUCCH according to Embodiment 2 of the present invention.

In addition, the UE sends the CSI set to the eNB through the PUCCH, and a bit sequence of a part or all of CSI in the CSI set may be encoded by using dual RM codes and transmitted through DFT-S-OFDM, as shown in FIG. 6. Specifically, the following steps are included:

Step 601: Divide a bit sequence of CSI in the CSI set to be transmitted into two parts.

The first part includes ceil(N/2) bits, and the second part includes [N−ceil(N/2)] bits, where N is the total number of bits in the bit sequence of the CSI in the CSI set to be transmitted, and ceil(N/2) denotes a minimum integer that is not less than N/2.

Step 602: Separately encode the two parts of the CSI bit sequence by using (32,0) RM codes to obtain 32 bits each, and remove 8 bits from the end of the 32 bits to obtain 24 encoding bits.

Step 603: Perform QPSK modulation on the obtained two parts of the 24 encoding bits to obtain 12 QPSK modulation symbols each.

Step 604: Sequentially map the obtained two parts of the 12 QPSK modulation symbols onto two timeslots of the PUCCH and transmit them to the eNB.

Further, during the transmission through DFT-S-OFDM and by using dual RM codes, CSI corresponding to two RS configurations may be transmitted at a time, that is, two pieces of CSI are transmitted at a time. It should be noted that the CSI includes an RI and/or a PMI and/or a CQI, and the less elements the CSI includes, the more precise the transmitted CSI set is.

Step 504: The eNB receives the CSI set sent by the UE, where the CSI set includes at least two pieces of CSI, and each piece of CSI in the CSI set sequentially corresponds to each RS configuration in the RS configuration set.

Step 505: The eNB sends data to the UE according to the CSI set.

Specifically, data is precoded according to the CSI set and by using a block diagonal matrix, which is formed by using $P_{PMI_i}$ as a submatrix, as a precoding matrix, where i=0, ..., N−1, N is the number of pieces of CSI in the CSI set, $PMI_i$ denotes a precoding matrix indicator in CSI with the mark of i in the CSI set, and $P_{PMI_i}$ is the precoding matrix indicated by $PMI_i$.

The precoded data is sent to the UE, that is, PS is sent to the UE, where S is the sent data.

Specifically, it is assumed that the CSI set reported by the UE and received by the eNB includes three pieces of CSI, namely, $CSI_0$ (including $RI_0$ and/or $PMI_0$ and/or $CQI_0$), $CSI_1$ (including $RI_1$ and/or $PMI_1$ and/or $CQI_1$), and $CSI_2$ (including $RI_2$ and/or $PMI_2$ and/or $CQI_2$), and a precoding matrix corresponding to and $RI_i$ and $PMI_i$ is $P_{PMI_i} \in CB_{N_i,RI_i}$, i=0, 1, 2, where $CB_{N_i,RI_i}$ denotes a code book where $P_{PMI_i}$ is located, and the number of antennas and the rank are $N_i$ and $RI_i$, i=0, 1, 2, respectively. In this case, the eNB may precode data s by using the block diagonal matrix P that is formed by $P_{PMI_i}$, i=0, 1, 2. For example, the precoding matrix may be:

$$P = \begin{bmatrix} P_{PMI_0} & 0 & 0 \\ 0 & P_{PMI_1} & 0 \\ 0 & 0 & P_{PMI_2} \end{bmatrix}$$

or $$P = \begin{bmatrix} P_{PMI_0} & 0 \\ 0 & P_{PMI_1} \end{bmatrix}$$

or $$P = \begin{bmatrix} P_{PMI_1} & 0 \\ 0 & P_{PMI_2} \end{bmatrix}$$

or $$P = P_{PMI_0}.$$

It should be noted that the precoding matrix has a block diagonal matrix structure, where each block matrix comes from an existing LTE R10 (LTE Release 10, LTE release 10) code book, the design of the code book can be simplified, and more importantly, the code book from which each block matrix comes matches antenna deployment of each transmission point/transmission point based on a co-located antenna design.

Step 506: The UE receives a signal sent by the eNB and performs data processing.

Specifically, the UE receives the signal sent by the eNB, and then sequentially acquires, according to that interference from a part of other data or all of the other data is canceled or the interference from all of the other data exists, data sent by the eNB, where the part of the other data or all of the other data refers to a part or all of data except the currently calculated data.

The UE performs data detection on the received signal y transmitted by the eNB, where y is given by using the following equation:

$$y = HPs + n \quad (19)$$

In the equation, H is a channel matrix, P is a precoding matrix, and n is noise and interference except interference from an antenna port that corresponds to each RS configuration in the RS configuration set.

Further, the UE may perform the data detection in a serial interference cancellation manner. For example, the detection is performed based on two groups, and equation (19) may be written as:

$$y = H_{e,0}s_0 + H_{e,1}s_1 + n \quad (20)$$

In the equation, $[H_{e,0}\ H_{e,1}] = HP$ and $$\begin{bmatrix} s_0 \\ s_1 \end{bmatrix} = s.$$

In this case, $s_0$ can be detected first based on equation (20) and by using $H_{e,1}s_1$ as an interference item, and then $s_1$ is detected based on the detected $s_0$ and the following equation:

$$y - H_{e00}s_0 = H_{e,1}s_1 + n \tag{21}$$

It should be noted that that interference from a part or all of data is canceled or the interference from all of the other data exists is obtained according to the received indication sent by the eNB or is obtained according to implicit specifying.

It should be noted that the multi-antenna transmission method provided in this embodiment of the present invention not only applies to the case of CSI RS configurations but also applies to the case of CRS configurations.

This embodiment of the present invention provides a multi-antenna transmission method. A reference signal RS configuration set sent by an eNB is received, each piece of CSI in a CSI set is measured based on the RS configuration set, the CSI set is sent to the eNB, then a signal sent by the eNB according to the CSI set can be received, and data processing is performed. Compared with the prior art in which a UE receives signals transmitted by geographically separated TPs and then received power is different, a precoding matrix obtained according to the prior art does not apply to a channel matrix with power imbalance, and this results in interference and system throughput degradation, in the solution provided in this embodiment of the present invention, by separately processing different transmission points, CSI feedback is performed for TPs resulting in different received power at a UE, thereby avoiding a power imbalance problem, effectively canceling or suppressing interference, eliminating an impact of received power imbalance, and effectively improving system throughput.

Figure 7:
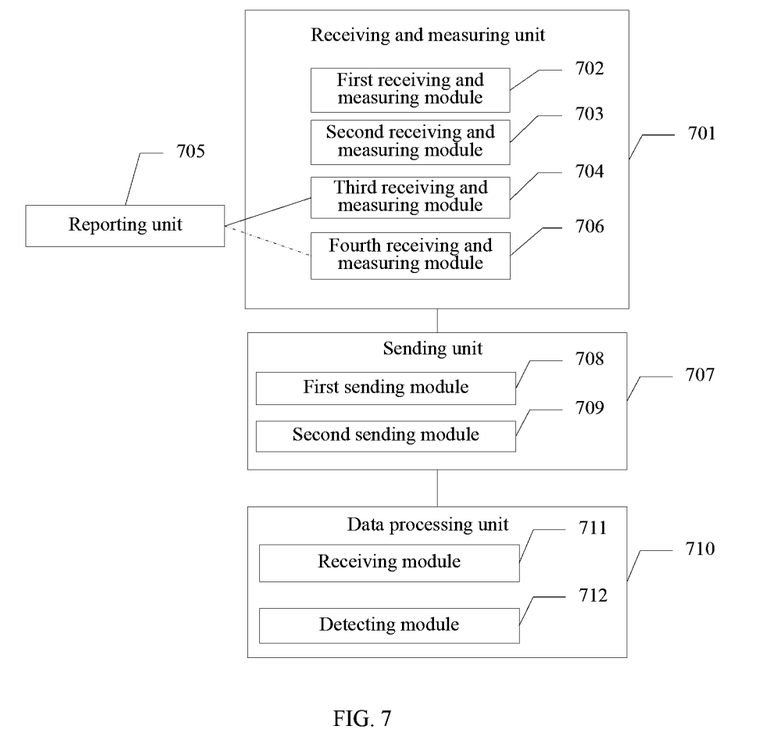
FIG. 7 is a block diagram of a multi-antenna transmission apparatus according to Embodiment 2 of the present invention.

This embodiment of the present invention provides a multi-antenna transmission apparatus, where the apparatus may be a UE, and as shown in FIG. 7, the apparatus includes: a receiving and measuring unit 701, a first receiving and measuring module 702, a second receiving and measuring module 703, a third receiving and measuring module 704, a reporting unit 705, a fourth receiving and measuring module 706, a sending unit 707, a first sending module 708, a second sending module 709, a data processing unit 710, a receiving module 711, and a detecting module 712.

The receiving and measuring unit 701 is configured to receive a reference signal RS configuration set sent by an evolved base station eNB, and acquire, based on the RS configuration set, channel state information CSI corresponding to each RS configuration in the RS configuration set, where the RS configuration set includes at least two RS configurations.

The CSI includes at least one of the following: a rank indicator RI, a precoding matrix indicator PMI, a channel quality indicator CQI, a precoding type indicator PTI, and other channel state information.

Specifically, when each piece of CSI in a channel state information CSI set is measured based on the RS configuration set, the following four manners may be adopted:

Manner 1: The first receiving and measuring module 702 is configured to separately acquire, based on the RS configuration set, the CSI corresponding to each RS configuration in the RS configuration set.

That the UE receives three RS configurations is used as an example, and it is assumed that the received RS configurations are $Config_0$, $Config_1$, and $Config_2$, respectively, the numbers of corresponding antenna ports are $N_0$, $N_1$, and $N_2$, respectively, and corresponding CSI is $CSI_0$, $CSI_1$, and $CSI_2$, respectively. In this case, the receiving and measuring unit 701 may be configured to receive the RS configurations, namely, $Config_0$, $Config_1$, and $Config_2$, and calculate $CSI_0$ (including $RI_0$ and/or $PMI_0$ and/or $CQI_0$), $CSI_1$ (including $RI_1$ and/or $PMI_1$ and/or $CQI_1$), and $CSI_2$ (including $RI_2$ and/or $PMI_2$ and/or $CQI_2$), respectively. Specifically, during calculation of a certain piece of CSI, the CSI corresponding to each RS configuration in the RS configuration may be acquired based on that interference from an antenna port that corresponds to another RS configuration in the RS configuration set exists or based on that no interference from the antenna port that corresponds to the another RS configuration in the RS configuration set exists or the interference from the antenna port that corresponds to the another RS configuration in the RS configuration set has been canceled. Here, the another RS configuration refers to an RS configuration except the RS configuration that corresponds to the currently calculated CSI in the RS configuration set.

For example, $RI_i$ and/or $PMI_i$ may be calculated as follows based on a capacity or throughput maximization criterion:

$$RI_i = \operatorname*{argmax}_{rank} \max_{pmi: P_{pmi} \in CB_{N_i, rank}} C_{y_i}(\text{rank},\ pmi) \tag{22}$$

$$PMI_i = \arg \max_{pmi: P_{pmi} \in CB_{N_i, RI_i}} C_{y_i}(RI_i,\ pmi) \tag{23}$$

In the equations, $CB_{N_i, rank}$ denotes a code book of $N_i$ antennas with a rank being rank, and $P_{pmi}$ denotes a precoding matrix corresponding to the precoding matrix indicator pmi. $C_{y_i}(\text{rank, pmi})$ denotes a function for obtaining capacity or throughput by using rank as the rank, pmi as the precoding matrix indicator, and an equation corresponding to $y_i$ as the system equation. The equation corresponding to $y_i$ may be shown as (24) or (25):

$$y_i = H_i P_{pmi} s_i + \sum_{j \neq i} \frac{1}{\sqrt{N_j}} H_j s_j + n, \tag{24}$$

$$P_{pmi} \in CB_{N_i, rank}$$

or $$y_i = H_i P_{pmi} s_i + n, \tag{25}$$

$$P_{pmi} \in CB_{N_i, rank}$$

In the equations, $H_i$ denotes a corresponding channel that the UE obtains by measuring an RS configuration $Config_i$, where $i = 0, 1,$ or $2$; $s_i$ denotes transmitted data or a transmitted modulation symbol; and n is noise and interference from other places (excluding interference from an antenna port that corresponds to each RS configuration in the RS configuration set). It should be noted that (24) is based on that the interference from the antenna port that corresponds to the another RS configuration in the RS configuration set exists; and (25) is based on that no interference from the antenna port that corresponds to the another RS configuration in the RS configuration set exists.

CQI$_i$ is calculated based on the RI$_i$ and/or the PMI$_i$, where CQI$_i$ denotes an i$^{th}$ channel quality indicator. Further, CQI$_i$ may be calculated based on the assumption that one or more transmission blocks (or code words) are transmitted, and in this case, one or more CQI, can be obtained.

Specifically, the UE obtains a corresponding channel when measuring an RS configuration, obtains a signal-to-noise ratio or an equivalent signal-to-noise ratio based on the adopted system equation (24) or (25) and an adopted receiver such as an MMSE (minimum mean square error) receiver, and may obtain a CQI by using a mapping relationship between the signal-to-noise ratio and the CQI.

Manner 2: The second receiving and measuring module 703 is configured to jointly acquire, based on the RS configuration set, the CSI corresponding to each RS configuration in the RS configuration set.

Specifically, that the UE receives three RS configurations is used as an example, where the three RS configurations are Config$_0$, Config$_1$, and Config$_2$, respectively, the numbers of corresponding antenna ports are N$_0$, N$_1$, and N$_2$, respectively, and three pieces of CSI, namely, CSI$_0$ (including RI$_0$ and/or PMI$_0$ and/or CQI$_0$), CSI$_1$ (including RI$_1$ and/or PMI$_1$ and/or CQI$_1$), and CSI$_2$ (including RI$_2$ and/or PMI$_2$ and/or CQI$_2$) can be jointly acquired.

Specifically, the second receiving and measuring module 703 may calculate and/or PMI$_i$ as follows based on a capacity or throughput maximization criterion:

$$(RI_0, RI_1, RI_2) = \arg\max_{(r_0, r_1, r_2)} \max_{(p_0, p_1, p_2)} f_y(r_0, r_1, r_2, p_0, p_1, p_2) \quad (26)$$

$$(PMI_0, PMI_1, PMI_2) = \arg\max_{(p_0, p_1, p_2)} f_y(RI_0, RI_1, RI_2, p_0, p_1, p_2) \quad (27)$$

In the equations, f$_y$(r$_0$,r$_1$,r$_2$,p$_0$,p$_1$,p$_2$) denotes a function for obtaining capacity or throughput by using r$_0$, r$_1$ and r$_2$ as ranks, p$_0$, p$_1$ and p$_2$ as the precoding matrix indicators, and an equation corresponding to y as the system equation. The equation corresponding to y is shown as (28):

$$y = \sum_i H_i P_{p_i} s_i + n, \quad (28)$$
$$P_{p_i} \in CB_{N_i, r_i},$$
$$i = 0, 1, 2$$

For each RS configuration Config$_i$, where i=0, 1, or 2, CQI$_i$ may be calculated based on the obtained RI$_i$ and/or PMI$_i$. Specifically, the UE obtains a corresponding channel when measuring an RS configuration, obtains a signal-to-noise ratio or an equivalent signal-to-noise ratio based on the adopted system equation (28), a precoding matrix corresponding to the obtained RI$_i$ and/or PMI$_i$, and an adopted receiver such as an MMSE (minimum mean square error) receiver, and may obtain each CQI by using a mapping relationship between the signal-to-noise ratio and the CQI.

Manner 3: The third receiving and measuring module 704 is configured to acquire, based on that no interference from antenna ports that correspond to a part or all of the RS configurations in the RS configuration set exists or interference from the antenna ports that correspond to the part or all of the RS configurations has been canceled, the CSI corresponding to each RS configuration in the RS configuration set.

Further, the third receiving and measuring module is further configured to receive an indication sent by the eNB, so as to obtain information that no interference from the antenna ports that correspond to the part or all of the RS configurations in the RS configuration set exists or the interference from the antenna ports that correspond to the part or all of the RS configurations has been canceled.

Still further, the received indication sent by the eNB is obtained by using a location sequence of each RS configuration in the RS configuration set sent by the eNB.

Here, the reporting unit 705 is further configured to report, to the eNB, the information that no interference from the antenna ports that correspond to the part or all of the RS configurations in the RS configuration set exists or the interference from the antenna ports that correspond to the part or all of the RS configurations has been canceled.

For example, that the UE receives three RS configurations is used as an example, and it is assumed that the received RS configurations are Config$_0$, Config$_1$, and Config$_2$, respectively, and Config$_0$, Config$_1$, and Config$_2$ are CSI RS Config.0, CSI RS Config.2, and CSI RS Config.1, respectively. For CSI$_2$, it is assumed that interference corresponding to CSI RS Config.0 and CSI RS Config.2 is canceled; for CSI$_1$, it is assumed that interference corresponding to CSI RS Config.0 is canceled and interference corresponding to CSI RS Config.2 exists; and for CSI$_0$, it is assumed that the interference corresponding to CSI RS Config.0 and CSI RS Config.2 exists.

Specifically, RI$_2$ and/or PMI$_2$ may be calculated as follows based on a capacity or throughput maximization criterion:

$$RI_2 = \arg\max_{r_2} \max_{p_2} g_{y_2}(r_2, p_2) \quad (29)$$

$$PMI_2 = \arg\max_{p_2} g_{y_2}(RI_2, p_2) \quad (30)$$

In the equations, g$_{y_2}$(r$_2$,p$_2$) denotes a function for obtaining capacity or throughput by using r$_2$ as the rank, p$_2$ as the precoding matrix indicator, and an equation corresponding to y$_2$ as the system equation. The equation corresponding to y$_2$ is shown as (31):

$$y_2 = H_2 P_{p_2} s_2 + n, P_{p_2} \in CB_{N_2, r_2} \quad (31)$$

It should be noted that in equation (31), it is assumed that no interference from antenna ports that correspond to Config$_0$ and Config$_1$ exists. In addition, for the RS configuration Config$_2$, CQI$_2$ may be calculated based on the obtained RI$_2$ and/or PMI$_2$, and CQI$_2$ may further be calculated based on that no interference from antenna ports that correspond to Config$_0$ and Config$_1$ exists.

RI$_1$ and/or PMI$_1$ is calculated as follows:

$$RI_1 = \arg\max_{r_1} \max_{p_1} g_{y_1}(r_1, p_1) \quad (32)$$

$$PMI_1 = \arg\max_{p_1} g_{y_1}(RI_1, p_1) \quad (33)$$

In the equations, g$_{y_1}$(r$_1$,p$_1$) denotes a function for obtaining capacity or throughput by using r$_1$ as the rank, p$_1$ as the precoding matrix indicator, and an equation corresponding to y$_1$ as the system equation. The equation corresponding to y$_1$ is shown as (34):

$$y_1 = H_1 P_{p_1} s_1 + \frac{1}{\sqrt{N_2}} H_2 s_2 + n \qquad (34)$$

It should be noted that in equation (34), it is assumed that no interference from an antenna port that corresponds to Config$_0$ exists, and only interference from an antenna port that corresponds to Config$_2$ is included. In addition, for the RS configuration Config$_1$, CQI$_1$ may be calculated based on the obtained RI$_1$ and/or PMI$_1$, and CQI$_1$ may further be calculated based on that the interference from the antenna port that corresponds to Config$_2$ exists. Alternatively, further, the equation corresponding to $y_1$ is shown as (35):

$$y_1 = H_1 P_{p_1} s_1 + H_2 P_{PMI_2} s_2 + n, P_{PMI_2} \in CB_{N_2, RI_2} \qquad (35)$$

In this case, CSI1 is further calculated based on CSI2. RI$_0$ and/or PMI$_0$ is calculated as follows:

$$RI_0 = \underset{r_0}{\mathrm{argmax}} \max_{p_0} g_{y_0}(r_0, p_0) \qquad (36)$$

$$PMI_0 = \underset{p_0}{\mathrm{argmax}}\, g_{y_0}(RI_0, p_0) \qquad (37)$$

In the equations, $g_{y_1}(r_1, p_1)$ denotes a function for obtaining capacity or throughput by using $r_0$ as the rank, $p_0$ as the precoding matrix indicator, and an equation corresponding to $y_0$ as the system equation. The equation corresponding to $y_0$ is shown as (38):

$$y_0 = H_0 P_{p_0} s_0 + \frac{1}{\sqrt{N_1}} H_1 s_1 + \frac{1}{\sqrt{N_2}} H_2 s_2 + n \qquad (38)$$

It should be noted that in equation (38), it is assumed that interference from antenna ports that correspond to Config$_1$ and Config$_2$ is included. In addition, for the RS configuration Config$_0$, CQI$_0$ may be calculated based on the obtained RI$_0$ and/or PMI$_0$, and CQI$_0$ may further be calculated based on that the interference from antenna ports that correspond to Config$_1$ and Config$_2$ exists.

Alternatively, further, the equation corresponding to $y_0$ is shown as (39):

$$y_0 = H_0 P_{p_0} s_0 + H_1 P_{PMI_1} s_1 + H_2 P_{PMI_2} s_2 + n, P_{PMI_i} \in CB_{N_i, RI_i}, \\ i=1,2 \qquad (39)$$

In this case, CSI0 is further calculated based on CSI1 and CSI2.

Manner 4: The fourth receiving and measuring module 706 is configured to acquire, based on CSI corresponding to a part or all of the RS configurations in the RS configuration set, the CSI corresponding to each RS configuration in the RS configuration set.

Further, the fourth receiving and measuring module is further configured to receive an indication sent by the eNB, so as to obtain the part or all of the RS configurations that correspond to the CSI corresponding to the part or all of the RS configurations in the RS configuration set.

Moreover, the received indication sent by the eNB is obtained by using a location sequence of each RS configuration in the RS configuration set sent by the eNB.

Here, the reporting unit 705 is further configured to report the part or all of the RS configurations that correspond to the CSI corresponding to the part or all of the RS configurations in the RS configuration set to the eNB.

For example, that the UE receives three RS configurations is used as an example, and it is assumed that the received RS configurations are Config$_0$, Config$_1$, and Config$_2$, respectively, and Config$_0$, Config$_1$, and Config$_2$ are CSI RS Config.0, CSI RS Config.2, and CSI RS Config.1, respectively. In this case, processing is performed according to the foregoing equations (29)-(33), (35)-(37), and (39), CSI$_1$ is calculated based on CSI$_2$, and CSI$_0$ is calculated based on CSI$_1$ and CSI$_2$. The calculation based on the CSI corresponding to the part or all of other RS configurations may be notified by the eNB or reported by the UE.

After each piece of CSI in the CSI set is obtained, the sending unit 707 is configured to send the CSI set to the eNB, so that the eNB performs data transmission based on the received CSI set.

Specifically, the first sending module 708 is configured to send the CSI set to the eNB through a physical uplink shared channel PUSCH; or the second sending module 709 is configured to send the CSI set to the eNB through a physical uplink control channel PUCCH.

Figure 8:
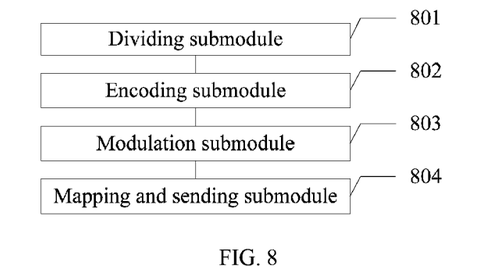
FIG. 8 is a block diagram of a second sending module according to Embodiment 2 of the present invention.

When the second sending module 709 is adopted to send the CSI set to the eNB, as shown in FIG. 8, the second sending module 709 includes: a dividing submodule 801, an encoding submodule 802, a modulation submodule 803, and a mapping and sending submodule 804.

The dividing submodule 801 is configured to divide a bit sequence of CSI in the CSI set to be transmitted into two parts.

Specifically, the first part includes ceil(N/2) bits, and the second part includes [N−ceil(N/2)] bits, where N is the total number of bits in the bit sequence of the CSI in the CSI set to be transmitted, and ceil(N/2) denotes a minimum integer that is not less than N/2.

The encoding submodule 802 is configured to separately encode the two parts of the CSI bit sequence by using (32,0) RM codes to obtain 32 bits each, and remove 8 bits from the end of the 32 bits to obtain 24 encoding bits.

The modulation submodule 803 is configured to perform QPSK modulation on the obtained two parts of the 24 encoding bits to obtain 12 QPSK modulation symbols each.

The mapping and sending submodule 804 is configured to sequentially map the obtained two parts of the 12 QPSK modulation symbols onto two timeslots of the PUCCH and transmit them to the eNB.

Further, during the transmission through DFT-S-OFDM and by using dual RM codes, CSI corresponding to two RS configurations may be transmitted at a time, that is, two pieces of CSI are transmitted at a time. It should be noted that the CSI includes an RI and/or a PMI and/or a CQI, and the less elements the CSI includes, the more precise the transmitted CSI set is.

The data processing unit 710 is configured to receive a signal sent by the eNB and perform data processing.

Specifically, the receiving module 711 in the data processing unit 710 is configured to receive the signal sent by the eNB; the detection module 712 is configured to sequentially acquire, according to that interference from a part of other data or all of the other data is canceled or the interference from all of the other data exists, data sent by the eNB, where the part of the other data or all of the other data refers to a part or all of data except the currently calculated data.

Further, that interference from a part of other data or all of the other data is canceled or the interference from all of the other data exists is obtained according to the received indication sent by the eNB or is obtained according to implicit specifying.

For example, the UE performs data detection on the signal y transmitted by the eNB, where y=HPS+n, n is noise and interference except interference from an antenna port that corresponds to each RS configuration in the RS configuration set, the UE may obtain n through measurement, P is a precoding matrix, H is a channel matrix, and UE may obtain H through measurement; in this case, y, H, P, and n are known, S can be calculated, and the data sent by the eNB is obtained.

Further, the UE may perform the data detection in a serial interference cancellation manner. For example, the detection is performed based on two groups, and y=HPS+n may be:

$$y = H_{e,0}s_0 + H_{e,1}s_1 + n.$$

In the equation, $[H_{e,0}\ H_{e,1}]$=HP and $$\begin{bmatrix} s_0 \\ s_1 \end{bmatrix} = s.$$

In this case, $s_0$ can be detected first based on the equation and by using $H_{e,1}s_1$ as an interference item, and then $s_1$ is detected based on the detected $s_0$ and the following equation:

$$y - H_{e,0}s_0 = H_{e,1}s_1 + n.$$

It should be noted that the interference item is notified to the UE by the eNB or is determined based on an implicit convention.

This embodiment of the present invention provides a multi-antenna transmission apparatus. A receiving and measuring unit receives a reference signal RS configuration set sent by an eNB, and acquires, based on the RS configuration set, CSI corresponding to each RS configuration in the RS configuration set; a sending unit sends a CSI set to the eNB, and then a data processing unit may receive a signal sent by the eNB according to the CSI set and perform data processing. Compared with the prior art in which a UE receives signals transmitted by geographically separated TPs and then received power is different, a precoding matrix obtained according to the prior art does not apply to a channel matrix with power imbalance, and this results in interference and system throughput degradation, in the solution provided in this embodiment of the present invention, by separately processing different transmission points, CSI feedback is performed for TPs resulting in different received power at a UE, thereby avoiding a power imbalance problem, effectively canceling or suppressing interference, eliminating an impact of received power imbalance, and effectively improving system throughput.

Figure 9:
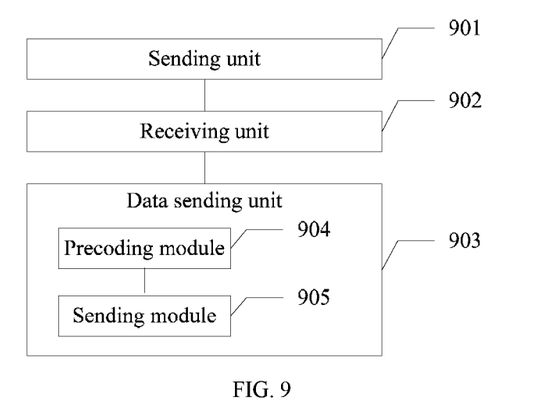
FIG. 9 is a block diagram of another multi-antenna transmission apparatus according to Embodiment 2 of the present invention.

This embodiment of the present invention further provides a multi-antenna transmission apparatus, where the apparatus may be an eNB, and as shown in FIG. 9, the apparatus includes: a sending unit 901, a receiving unit 902, a data sending unit 903, a precoding module 904, and a sending module 905.

The sending unit 901 is configured to send an RS configuration set to a UE, so that the UE acquires, according to the received RS configuration set, CSI corresponding to each RS configuration in the RS configuration set, where the RS configuration set includes at least two RS configurations.

The RS configuration set includes RS configurations that have a same cell identifier, resources occupied by the RS configurations that have the same cell identifier are orthogonal to each other, and that resources occupied by the RS configurations that have the same cell identifier are orthogonal to each other includes:

the RS configurations that have the same cell identifier occupy different time resources; or the RS configurations that have the same cell identifier occupy different frequency resources; or the RS configurations that have the same cell identifier occupy different sequence resources; or the RS configurations that have the same cell identifier occupy different scrambling code resources.

After measuring each piece of CSI in the CSI set, the UE sends the CSI set to the eNB; and the receiving unit 902 is configured to receive the CSI set sent by the UE, where the CSI set includes the CSI corresponding to each RS configuration in the RS configuration set.

The data sending unit 903 is configured to send data to the UE according to the received CSI set.

Specifically, the precoding module 904 in the sending unit 903 is configured to precode data according to the CSI set and by using a block diagonal matrix, which is formed by using $P_{PMI_i}$ as a submatrix, where i=0, ..., N-1, N is the number of pieces of CSI in the CSI set, $PMI_i$ denotes a precoding matrix indicator in CSI with the mark of i in the CSI set, and $P_{PMI_i}$ is the precoding matrix indicated by $PMI_i$.

Specifically, it is assumed that the CSI set reported by the UE and received by the eNB includes three pieces of CSI, namely, $CSI_0$ (including $RI_0$ and/or $PMI_0$ and/or $CQI_0$), $CSI_1$ (including $RI_1$ and/or $PMI_1$ and/or $CQI_1$), and $CSI_2$ (including $RI_2$ and/or $PMI_2$ and/or $CQI_2$), and a precoding matrix corresponding to $RI_i$ and $PMI_i$ is $P_{PMI_i} \in CB_{N_i,RI_i}$, i=0, 1, 2, where $CB_{N_i,RI_i}$ denotes a code book where $P_{PMI_i}$ is located, and the number of antennas and the rank are $N_i$ and $RI_i$, i=0, 1, 2, respectively. In this case, the eNB may precode data s by using the block diagonal matrix P that is formed by $P_{PMI_i}$, i=0, 1, 2. For example, the precoding matrix may be:

$$P = \begin{bmatrix} P_{PMI_0} & 0 & 0 \\ 0 & P_{PMI_1} & 0 \\ 0 & 0 & P_{PMI_2} \end{bmatrix}$$

or $$P = \begin{bmatrix} P_{PMI_0} & 0 \\ 0 & P_{PMI_1} \end{bmatrix}$$

or $$P = \begin{bmatrix} P_{PMI_1} & 0 \\ 0 & P_{PMI_2} \end{bmatrix}$$

or $$P = P_{PMI_0}.$$

It should be noted that the precoding matrix has a block diagonal matrix structure, where each block matrix comes from an existing LTE R10 (LTE Release 10, LTE release 10) code book, the design of the code book can be simplified, and more importantly, the code book from which each block matrix comes matches antenna deployment of each transmission point/transmission point based on a co-located antenna design.

The sending module 905 is configured to send the precoded data to the UE.

This embodiment of the present invention provides a multi-antenna transmission apparatus. A sending unit sends an RS configuration set to a UE, so that the UE acquires a CSI set according to the received RS configuration set, a receiving unit receives the CSI set sent by the UE, and a data sending unit sends data to the UE according to the CSI set. Compared with the prior art in which a UE receives signals transmitted by geographically separated TPs and then received power is different, a precoding matrix obtained according to the prior art does not apply to a channel matrix with power imbalance, and this results in interference and system throughput degradation, in the solution provided in this embodiment of the present invention, by separately processing different transmission points, CSI feedback can be performed for TPs resulting in different received power at a UE, thereby avoiding a power imbalance problem, effectively canceling or suppressing interference, eliminating an impact of received power imbalance, and effectively improving system throughput.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A multi-antenna transmission method, comprising: receiving, by a user equipment (UE), a reference signal (RS) configuration set sent by an evolved base station (eNB), and
    acquiring, by the UE, based on the RS configuration set, each channel state information (CSI) corresponding to each RS configuration in the RS configuration set, based on no existence of interference from antenna ports corresponding to part or all of the RS configurations in the RS configuration set, or cancelation of interference from the antenna ports corresponding to the part or all of the RS configurations, wherein the RS configuration set comprises at least two RS configurations;
    sending, by the UE, a CSI set to the eNB through a physical uplink control channel (PUCCH), wherein the CSI set comprises the each CSI corresponding to each RS configuration in the RS configuration set;
    receiving, by the UE, a signal sent by the eNB according to the CSI set, and performing data processing; and
    wherein sending, by the UE, the CSI set to the eNB through the PUCCH comprises:
    dividing, by the UE, a bit sequence of CSI in the CSI set to be transmitted into two parts;
    separately encoding, by the UE, the two parts of the CSI bit sequence by using (32,0) RM codes to obtain 32 bits for each of the two parts, and removing 8 bits from the end of the 32 bits of each part to obtain 24 encoding bits for each part;
    performing quadrature phase shift keying (QPSK) modulation, by the UE, on the obtained 24 encoding bits for each part to obtain 12 QPSK modulation symbols for each part; and
    sequentially mapping, by the UE, the obtained 12 QPSK modulation symbols for each part onto two timeslots of the PUCCH and transmitting the obtained 12 QPSK modulation symbols for each part to the eNB.

2. The multi-antenna transmission method according to claim 1, wherein the each CSI comprises at least one of the following: a rank indicator (RI), a precoding matrix indicator PMI, a channel quality indicator (CQI), and a precoding type indicator (PTI).

3. The multi-antenna transmission method according to claim 1, wherein the acquiring the CSI further comprises:
    acquiring, based on that an interference from an antenna port that corresponds to another RS configuration in the RS configuration set exists, the CSI corresponding to each RS configuration in the RS configuration, wherein the another RS configuration refers to an RS configuration except an RS configuration corresponding to currently calculated CSI; or
    acquiring, based on that no interference from an antenna port that corresponds to another RS configuration in the RS configuration set exists or interference from the antenna port that corresponds to the another RS configuration in the RS configuration set has been canceled, the CSI corresponding to each RS configuration in the RS configuration.

4. The multi-antenna transmission method according to claim 2, wherein the based on that no interference from antenna ports that correspond to a part or all of the RS configurations in the RS configuration set exists or interference from the antenna ports that correspond to the part or all of the RS configurations in the RS configuration set has been canceled, and the part or all of the RS configurations in the RS configuration set are obtained based on a received indication sent by the eNB or are reported by the UE to the eNB.

5. The multi-antenna transmission method according to claim 4, wherein the received indication sent by the eNB is obtained by receiving, by the UE, a location sequence of each RS configuration in the RS configuration set sent by the eNB.

6. The multi-antenna transmission method according to claim 2, wherein the based on CSI corresponding to a part or all of the RS configurations in the RS configuration set, and the part or all of the RS configurations in the RS configuration set are obtained based on a received indication sent by the eNB or are reported by the UE to the eNB.

7. The multi-antenna transmission method according to claim 6, wherein the received indication sent by the eNB is obtained by receiving, by the UE, a location sequence of each RS configuration in the RS configuration set sent by the eNB.

8. The multi-antenna transmission method according to claim 1, wherein the receiving a signal sent by the eNB and performing data processing comprises:
    sequentially acquiring, according to that interference from a part of other data or all of the other data is canceled or the interference from all of the other data exists, data sent by the eNB, wherein the part of the other data or all of the other data refers to a part or all of data except currently calculated data.

9. The multi-antenna transmission method according to claim 8, wherein that interference from a part of other data or all of the other data is canceled or the interference from all of the other data exists is obtained according to the received indication sent by the eNB or is obtained according to implicit specifying.

10. A multi-antenna transmission method, comprising:
    sending, by an evolved base station (eNB), a reference signal (RS) configuration set to a user equipment (UE), so that the UE acquires, according to the received RS configuration set, each channel state information (CSI) corresponding to each RS configuration in the RS configuration set, based on no existence of interference from antenna ports corresponding to part or all of the RS configurations in the RS configuration set, or cancelation of interference from the antenna ports corresponding to the part or all of the RS configurations;
wherein the RS configuration set comprises at least two RS configurations, and the RS configuration set comprises RS configurations that have a same cell identifier, and resources occupied by the RS configurations that have the same cell identifier are orthogonal to each other;
receiving, by the eNB, a CSI set sent by the UE through a physical uplink control channel (PUCCH), wherein the CSI set comprises the CSI corresponding to each RS configuration in the RS configuration set;
sending, by the eNB, data to the UE according to the received CSI set; and
wherein for receiving, by the eNB, a CSI sent by the UE, the UE further comprising:
dividing a bit sequence of CSI in the CSI set to be transmitted into two parts;
separately encoding the two parts of the CSI bit sequence by using (32,0) RM codes to obtain 32 bits for each of the two parts, and removing 8 bits from the end of the 32 bits of each part to obtain 24 encoding bits for each part;
performing quadrature phase shift keying (QPSK) modulation on the obtained 24 encoding bits for each part to obtain 12 QPSK modulation symbols for each part; and
sequentially mapping the obtained 12 QPSK modulation symbols for each part onto two timeslots of the PUCCH and transmitting the obtained 12 QPSK modulation symbols for each part to the eNB.

11. The multi-antenna transmission method according to claim 10, wherein that resources occupied by the RS configurations that have the same cell identifier are orthogonal to each other comprises:
the RS configurations that have the same cell identifier occupy different time resources; or
the RS configurations that have the same cell identifier occupy different frequency resources; or
the RS configurations that have the same cell identifier occupy different sequence resources; or
the RS configurations that have the same cell identifier occupy different scrambling code resources.

12. The multi-antenna transmission method according to claim 10, wherein the sending data to the UE according to the received CSI set comprises:
precoding the data according to the CSI set and by using a block diagonal matrix, which is formed by using $P_{PMI_i}$ as a submatrix, wherein i=0, . . . , N−1, N is the number of pieces of CSI in the CSI set, $PMI_i$ denotes a precoding matrix indicator in CSI with the mark of i in the CSI set, and $P_{PMI_i}$ is the precoding matrix indicated by ($PMI_i$); and
sending the precoded data to the UE.

13. A multi-antenna transmission apparatus, comprising:
a receiver, configured to receive a reference signal (RS) configuration set sent by an evolved base station (eNB), wherein the RS configuration set comprises at least two RS configurations;
a processor, configured to acquire, based on the RS configuration set, each channel state information (CSI) corresponding to each RS configuration in the RS configuration set, based on no existence of interference from antenna ports corresponding to part or all of the RS configurations in the RS configuration set, or cancelation of interference from the antenna ports corresponding to the part or all of the RS configurations; and
a transmitter, configured to send a CSI set to the eNB through a physical uplink control channel (PUCCH), wherein the CSI set comprises the each CSI corresponding to each RS configuration in the RS configuration set;
wherein the receiver is configured to receive a signal sent by the eNB according to the CSI set, and wherein the processor is configured to perform data processing;
wherein for the transmitter, configured to send a CSI set to the eNB through the PUCCH, the processor is further configured to:
divide a bit sequence of CSI in the CSI set to be transmitted into two parts;
separately encode the two parts of the CSI bit sequence by using (32,0) RM codes to obtain 32 bits for each of the two parts, and removing 8 bits from the end of the 32 bits of each part to obtain 24 encoding bits for each part;
perform quadrature phase shift keying (QPSK) modulation on the obtained 24 encoding bits for each part to obtain 12 QPSK modulation symbols for each part; and
sequentially map the obtained 12 QPSK modulation symbols for each part onto two timeslots of the PUCCH and transmitting the obtained 12 QPSK modulation symbols for each part to the eNB.

14. The multi-antenna transmission apparatus according to claim 13, wherein the each CSI comprises at least one of the following: a rank indicator MI a precoding matrix indicator (PMI), a channel quality indicator (CQI), and a precoding type indicator (PTI).

15. The multi-antenna transmission apparatus according to claim 14, wherein the processor is configured to acquire, based on that an interference from an antenna port that corresponds to another RS configuration in the RS configuration set exists, the CSI corresponding to each RS configuration in the RS configuration, wherein the another RS configuration refers to an RS configuration except an RS configuration corresponding to currently calculated CSI; or
the processor is configured to acquire, based on that no interference from an antenna port that corresponds to another RS configuration in the RS configuration set exists or interference from the antenna port that corresponds to the another RS configuration in the RS configuration set has been canceled, the CSI corresponding to each RS configuration in the RS configuration.

16. The multi-antenna transmission apparatus according to claim 14, wherein the receiver is further configured to receive an indication sent by the eNB, so as to obtain information that no interference from the antenna ports that correspond to the part or all of the RS configurations in the RS configuration set exists or the interference from the antenna ports that correspond to the part or all of the RS configurations has been canceled; and
the processor is further configured to report, to the eNB, the information that no interference from the antenna ports that correspond to the part or all of the RS configurations in the RS configuration set exists or the interference from the antenna ports that correspond to the part or all of the RS configurations has been canceled.

17. The multi-antenna transmission apparatus according to claim 16, wherein the received indication sent by the eNB is obtained by using a location sequence of each RS configuration in the RS configuration set sent by the eNB.

18. The multi-antenna transmission apparatus according to claim 14, wherein the receiver is further configured to receive an indication sent by the eNB, so as to obtain the part or all of the RS configurations in the RS configuration set; and the transmitter is further configured to report the part or all of the RS configurations in the RS configuration set to the eNB.

19. The multi-antenna transmission apparatus according to claim 18, wherein the received indication sent by the eNB is obtained by using a location sequence of each RS configuration in the RS configuration set sent by the eNB.

20. The multi-antenna transmission apparatus according to claim 13, wherein the processor is further configured to sequentially acquire, according to that interference from a part of other data or all of the other data is canceled or the interference from all of the other data exists, data sent by the eNB, wherein the part of the other data or all of the other data refers to a part or all of data except currently calculated data.

21. The multi-antenna transmission apparatus according to claim 20, wherein that interference from a part of other data or all of the other data is canceled or the interference from all of the other data exists is obtained according to the received indication sent by the eNB or is obtained according to implicit specifying.

22. A multi-antenna transmission apparatus, comprising:
a transmitter, configured to send reference signal (RS) configuration set to a user equipment (UE) for acquiring, according to the sent RS configuration set, each channel state information (CSI) corresponding to each RS configuration in the RS configuration set, based on no existence of interference from antenna ports corresponding to part or all of the RS configurations in the RS configuration set, or cancelation of interference from the antenna ports corresponding to the part or all of the RS configurations; wherein the RS configuration set comprises at least two RS configurations; and the RS configuration set comprises RS configurations that have a same cell identifier, and resources occupied by the RS configurations that have the same cell identifier are orthogonal to each other;
a receiver, configured to receive a CSI set sent by the UE through a physical uplink control channel (PUCCH), wherein the CSI set comprises the each CSI corresponding to each RS configuration in the RS configuration set;

the transmitter, configured to send data to the UE according to the received CSI set; and wherein for the receiver, configured to receive a CSI set sent by the UE, the UE is configured to:
divide a bit sequence of CSI in the CSI set to be transmitted into two parts;
separately encode the two parts of the CSI bit sequence by using (32,0) RM codes to obtain 32 bits for each of the two parts, and removing 8 bits from the end of the 32 bits of each part to obtain 24 encoding bits for each part;
perform quadrature phase shift keying (QPSK) modulation on the obtained 24 encoding bits for each part to obtain 12 QPSK modulation symbols for each part; and
sequentially map the obtained 12 QPSK modulation symbols for each part onto two timeslots of the PUCCH and transmitting the obtained 12 QPSK modulation symbols for each part to the eNB.

23. The multi-antenna transmission apparatus according to claim 22, wherein that resources occupied by the RS configurations that have the same cell identifier are orthogonal to each other comprises:
the RS configurations that have the same cell identifier occupy different time resources; or
the RS configurations that have the same cell identifier occupy different frequency resources; or
the RS configurations that have the same cell identifier occupy different sequence resources; or
the RS configurations that have the same cell identifier occupy different scrambling code resources.

24. The multi-antenna transmission apparatus according to claim 22, wherein the processor is configured to:
precode the data according to the CSI set and by using a block diagonal matrix, which is formed by using $P_{PMI_i}$ as a submatrix, wherein i=0, . . . , N−1, N is the number of pieces of CSI in the CSI set, $PMI_i$ denotes a precoding matrix indicator in CSI with the mark of i in the CSI set, and $P_{PMI_i}$ is the precoding matrix indicated by $PMI_i$; and
the transmitter is further configured to send the precoded data to the UE.

* * * * *